US 6,636,859 B2

(12) United States Patent  (10) Patent No.: US 6,636,859 B2
Banerjee  (45) Date of Patent: Oct. 21, 2003

(54) METHOD AND SYSTEM FOR REASSEMBLING FRAGMENTED DATAGRAMS UTILIZING A PLURALITY OF CONCURRENTLY ACCESSIBLE REASSEMBLY QUEUES

(75) Inventor: Dwip N. Banerjee, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 363 days.

(21) Appl. No.: 09/826,706

(22) Filed: Apr. 5, 2001

(65) Prior Publication Data
US 2002/0147722 A1 Oct. 10, 2002

(51) Int. Cl.7 .............................................. G06F 17/30
(52) U.S. Cl. ............................... 707/100; 707/3; 707/8; 707/200; 709/232; 709/236
(58) Field of Search ........................... 707/1, 2, 3, 100, 707/101, 103, 104.1, 200, 206, 8; 709/227, 228, 230, 232, 236, 237, 250

(56) References Cited

U.S. PATENT DOCUMENTS 5,815,516 A * 9/1998 Aaker et al. ................ 709/236
6,202,060 B1 * 3/2001 Tran ............................ 707/3
6,421,730 B1 * 7/2002 Narad et al. ................ 709/236
6,434,620 B1 * 8/2002 Boucher et al. ............ 709/230
6,546,425 B1 * 4/2003 Hanson et al. .............. 709/227

OTHER PUBLICATIONS

Armitage, Grenville et al., "Packet Reassembly During Cell Loss", IEEE Network, Sep. 1993, pp. 26–34.*
Lee, Dongman et al., "A Reliable Datagram Transport Protocol on Local Area Network", Proceedings of the ACM SIGCOMM conference on Communications architectures & protocols, Sep. 1986, pp. 320–327.*

* cited by examiner

Primary Examiner—Shahid Al Alam
(74) Attorney, Agent, or Firm—Volel Emile; Diana L. Roberts; Bracewell & Patterson, L.L.P.

(57) ABSTRACT

A method, system and program product for reassembling fragmented datagrams is described. A plurality of fragments of a plurality of datagrams are received by a recipient data processing system. In response to receipt of the plurality of fragments, a plurality of processes concurrently access a reassembly data structure to store the plurality of fragments, such that the plurality of datagrams are incrementally reassembled from the plurality of fragments. In one embodiment, the reassembly data structure can be implemented as a list containing a plurality of reassembly queues that each contain one or more queue entries for reassembling a respective datagram. Data integrity of the reassembly data structure can be maintained by associating a respective one of a plurality of locks with each of the plurality of reassembly queues so that only one process at a time can access each reassembly queue.

18 Claims, 3 Drawing Sheets

METHOD AND SYSTEM FOR REASSEMBLING FRAGMENTED DATAGRAMS UTILIZING A PLURALITY OF CONCURRENTLY ACCESSIBLE REASSEMBLY QUEUES

BACKGROUND OF THE INVENTION

1. Technical Field

The present invention relates in general to data processing and, in particular, to data processing system communication. Still more particularly, the present invention relates to a data processing system, method and program product for reassembling fragmented datagrams.

2. Description of the Related Art

The Internet can generally be defined as a worldwide collection of heterogeneous communication networks and associated gateways, bridges and routers that all employ the TCP/IP (Transport Control Protocol/Internet Protocol) suite of protocols to communicate data packets between a source and one or more destinations. As is well known to those skilled in the art, the TCP/IP suite of protocols corresponds to layers 3 and 4 (the network and transport layers, respectively) of the seven-layer International Organization for Standardization Open Systems Interconnection (ISO/OSI) reference model, which provides a convenient framework for discussing communication protocols. The ISO/OSI reference model further includes physical and link layers (layers 1 and 2, respectively) below the network and transport layers, and session, presentation, and application layers (layers 5 through 7, respectively) above the network and transport layers.

In communicating TCP/IP datagrams between devices over the Internet (or other networks), the maximum transmission unit (MTU) size of the various interfaces through which datagrams are communicated may differ. Accordingly, during output of a datagram, the sending IP layer checks if a data gram can be sent unfragmented. If so, the sending IP layer outputs the datagram through its interface unfragmented. However, if the sending EP layer determines the datagram cannot be transmitted unfragmented because the datagram size exceeds the interface's MTU, the sending IP layer disassembles the datagram into fragments smaller than its interface's MTU and outputs the fragments. During transmission, these fragments may be subject to further fragmentation by routers along the path to the recipient.

When the fragments of the datagram are received by the intended recipient, the receiving IP layer at the recipient must compile the original datagram from the received fragments. Because the recipient does not necessarily receive the fragments sequentially and may receive duplicate fragments, the receiving IP layer needs some mechanism to buffer received fragments and reassemble them to form a datagram. In the prior art, this mechanism is implemented as a single reassembly queue for all of the IP layer, as described in Chapter 10 of Stevens, *TCP/IP Illustrated Volume* 2, which is incorporated herein by reference as background material.

The present invention recognizes that the use of a single reassembly queue by all of the IP layer undesirably limits communication performance. For example, in a symmetric multiprocessor (SMP) computer system, such as those commonly employed as e-commerce servers and the like, a large number of processes may be receiving numerous fragments belonging to different datagrams. Thus, many processes may desire to access the reassembly queue at the same time. However, to ensure the data integrity of the single reassembly queue under these conditions, access by the processes to the single reassembly queue is serialized by a lock that can be owned by only one process at a time. Contention for ownership of the lock can therefore severely degrade performance, particularly under high traffic conditions.

SUMMARY OF THE INVENTION

The present invention overcomes the foregoing and additional shortcomings in the art by providing an improved data processing system, method and program product for reassembling fragmented datagrams utilizing multiple reassembly queues that can be accessed in parallel by multiple processes.

In accordance with the present invention, a plurality of fragments of a plurality of datagrams are received by a recipient data processing system. In response to receipt of the plurality of fragments, a plurality of processes concurrently access a reassembly data structure to store the plurality of fragments, such that the plurality of datagrams are incrementally reassembled from the plurality of fragments. In one embodiment, the reassembly data structure can be implemented as a list containing a plurality of reassembly queues that each contain one or more queue entries for reassembling a respective datagram. Data integrity of the reassembly data structure can be maintained by associating a respective one of a plurality of locks with each of the plurality of reassembly queues so that only one process at a time can access each reassembly queue.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
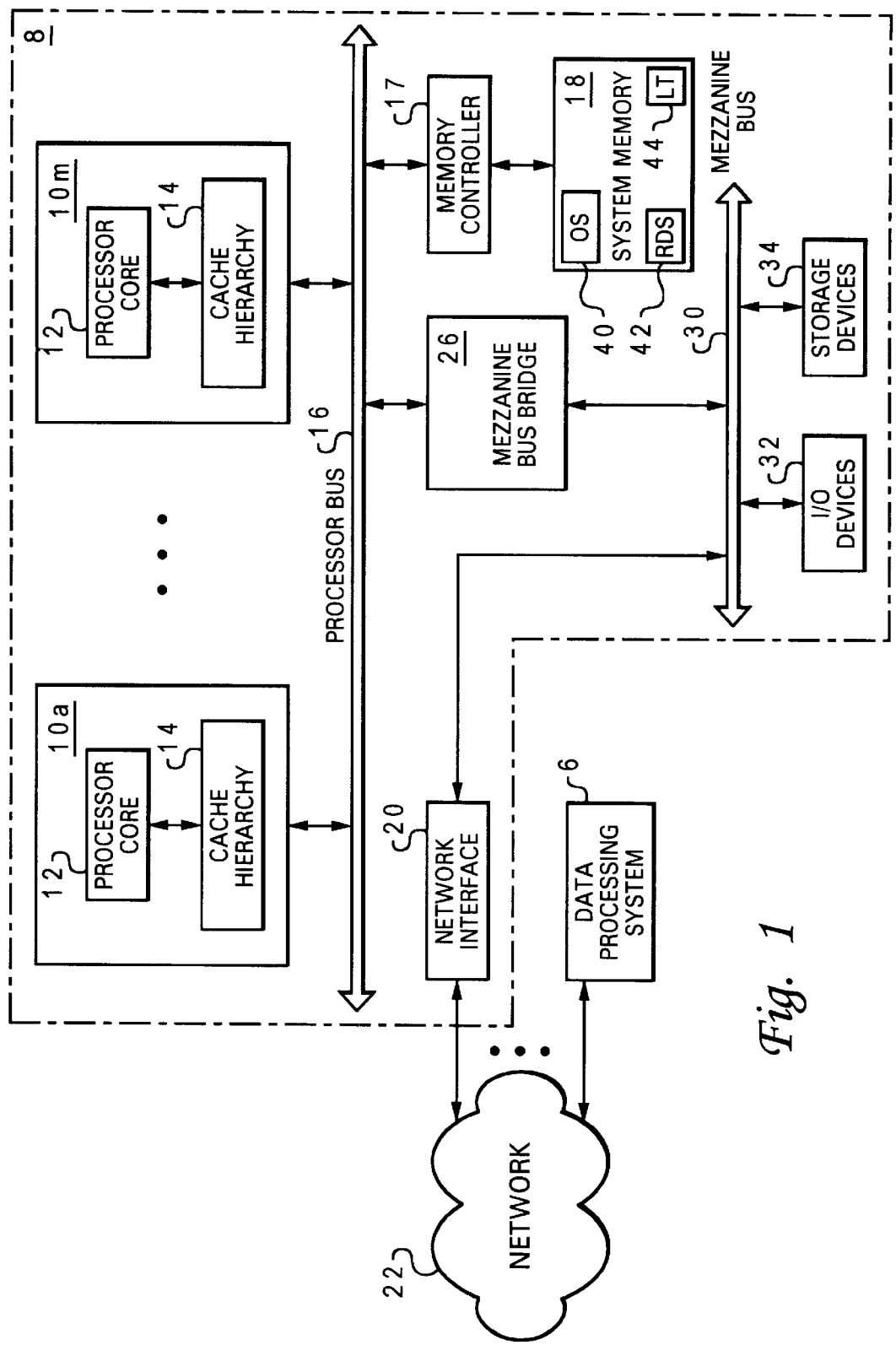
FIG. 1 depicts an illustrative embodiment of a data processing system with which the present invention may advantageously be utilized.

With reference now to the figures and in particular with reference to FIG. 1, there is depicted a high level block diagram of an exemplary data processing system 8 in accordance with the present invention. In this illustrated embodiment, data processing system 8 is a server computer system that is coupled to a network 22 for communication with a second data processing system 6, which may function, for example, as a client. Communication between data processing systems 6 and 8 can employ any of a number of known or future protocols that support fragmentation of datagrams, including without limitation TCP/IP, UDP (User Datagram Protocol) over IP, WAP (Wireless Application Protocol), or Bluetooth. As discussed above, datagram fragmentation may be necessary because one or more interfaces within network 22 traversed by the communication may have an MTU that is smaller than the datagrams to be transmitted.

As illustrated, data processing system 8 includes a number of processors 10a–10m, which each have a processor core 12 containing registers, instruction flow logic and execution units utilized to execute program instructions and an on-chip cache hierarchy 14 that stages data and instructions to the associated processor core 12 from system memory 18. Processors 10 access system memory 18 via a processor bus 16 and a memory controller 17.

Processor bus 16 is further coupled, via mezzanine bus bridge 26, to a mezzanine bus 30, which may be implemented as a Peripheral Component Interconnect (PCI) local bus, for example. Mezzanine bus bridge 26 provides both a low latency path through which processors 10 may directly access I/O devices 32 and storage devices 34 that are mapped to bus memory and/or I/O address spaces and a high bandwidth path through which I/O devices 32 and storage devices 34 may access system memory 18. I/O devices 32 may include, for example, a display device, input devices, and serial and parallel ports. Storage devices 34, on the other hand, may include optical or magnetic disks that provide non-volatile storage for operating system and application software. A network interface card 20 is also coupled to mezzanine bus 30 to support communication with network 22.

In operation, data processing system 8 operates under the control of a multitasking operating system (OS) 40, such as AIX (Advanced Interactive eXecutive), which is at least partially resident within system memory 18. OS 40 supports the concurrent execution of multiple processes by processors 10a–10m, and one of the functions of the processes of OS 40 is to fragment and reassemble datagrams communicated between data processing systems 6 and 8 via network 22. To reassemble fragmented datagrams, OS 40 creates and maintains a data structure, referred to herein as a reassembly data structure (RDS) 40 having an associated lock table (LT) 44 from which each process must obtain a lock prior to accessing RDS 40.

Figure 2:
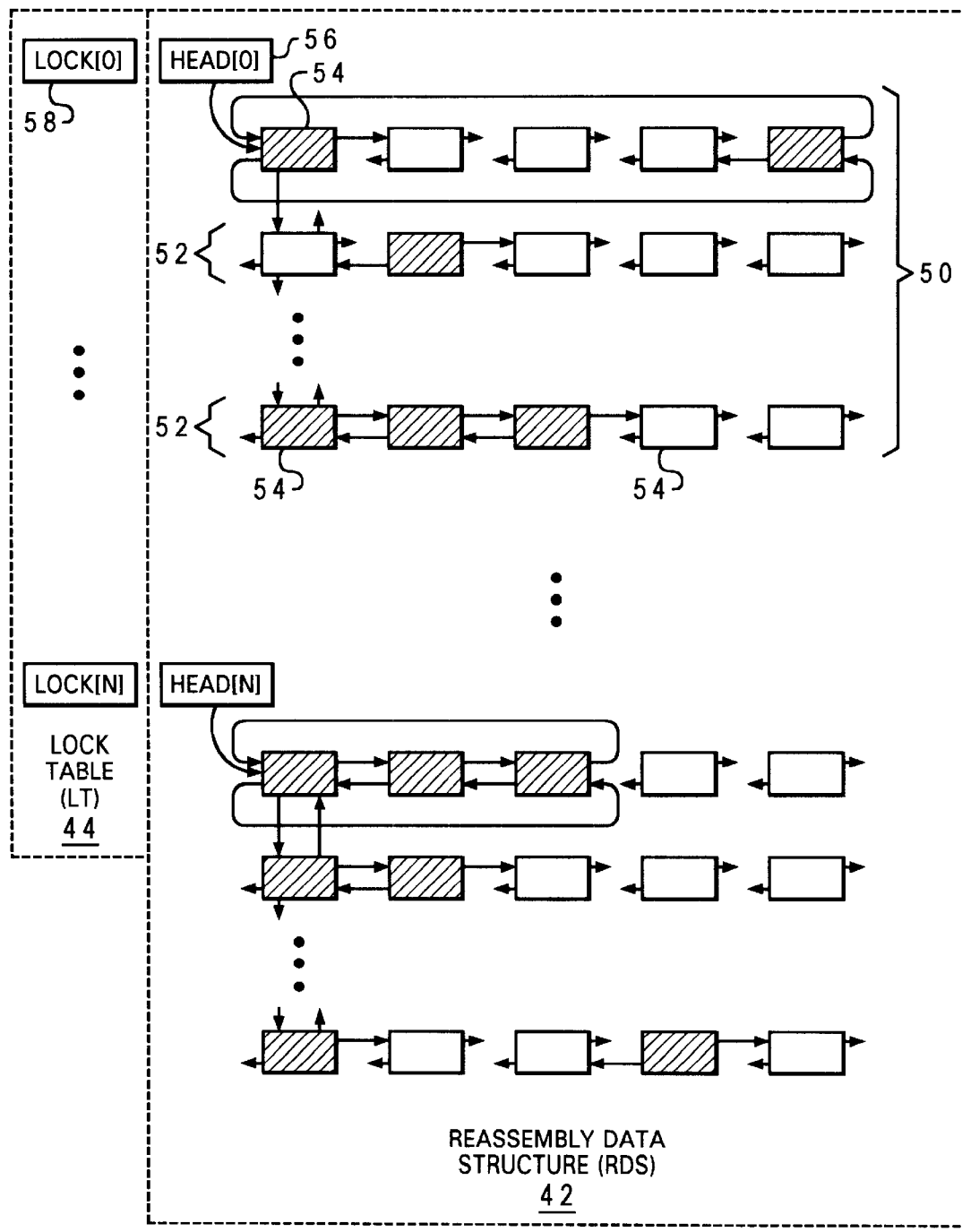
FIG. 2 illustrates a linked list data structure for parallel datagram reassembly by multiple processes in accordance with a preferred embodiment of the present invention.

Referring now to FIG. 2, there is illustrated a more detailed depiction of exemplary embodiment of reassembly data structure (RDS) 42 and lock table (LT) 44 in accordance with the present invention. As illustrated, in contrast to prior art datagram reassembly techniques, which utilize only a single reassembly queue that can be accessed by only one process at a time, the present invention employs a RDS 42 including multiple (in this case N) reassembly queues 50 that can be accessed concurrently by multiple processes.

Although not required for all embodiments of the present invention, in the illustrated embodiment, the N reassembly queues 50 are organized into a list, in which each reassembly queue 50 contains one or more queue entries 52 for reassembling respective datagrams. The system memory address of the top of each reassembly queue 50 is specified by a head pointer 56 that points to the first location 54 in the first queue entry 52 of that reassembly queue 50. Each queue entry 52 is constructed as a doubly-linked list of storage locations 54 for storing datagram fragments. In FIG. 2, locations 54 containing fragments are illustrated with shading, and empty locations 54 are illustrated without shading.

To ensure the data integrity of RDS 42, each reassembly queue 50 has an associated lock 58 within lock table 44. In order for a process to modify a reassembly queue 50 (e.g., by inserting a fragment or by deallocating a reassembled datagram from a queue entry 52), the process must gain ownership of the lock 58 associated with the reassembly queue 50. Thus, the present invention permits up to N processes to concurrently access RDS 42, rather than only a single process as in the prior art.

Figure 3:
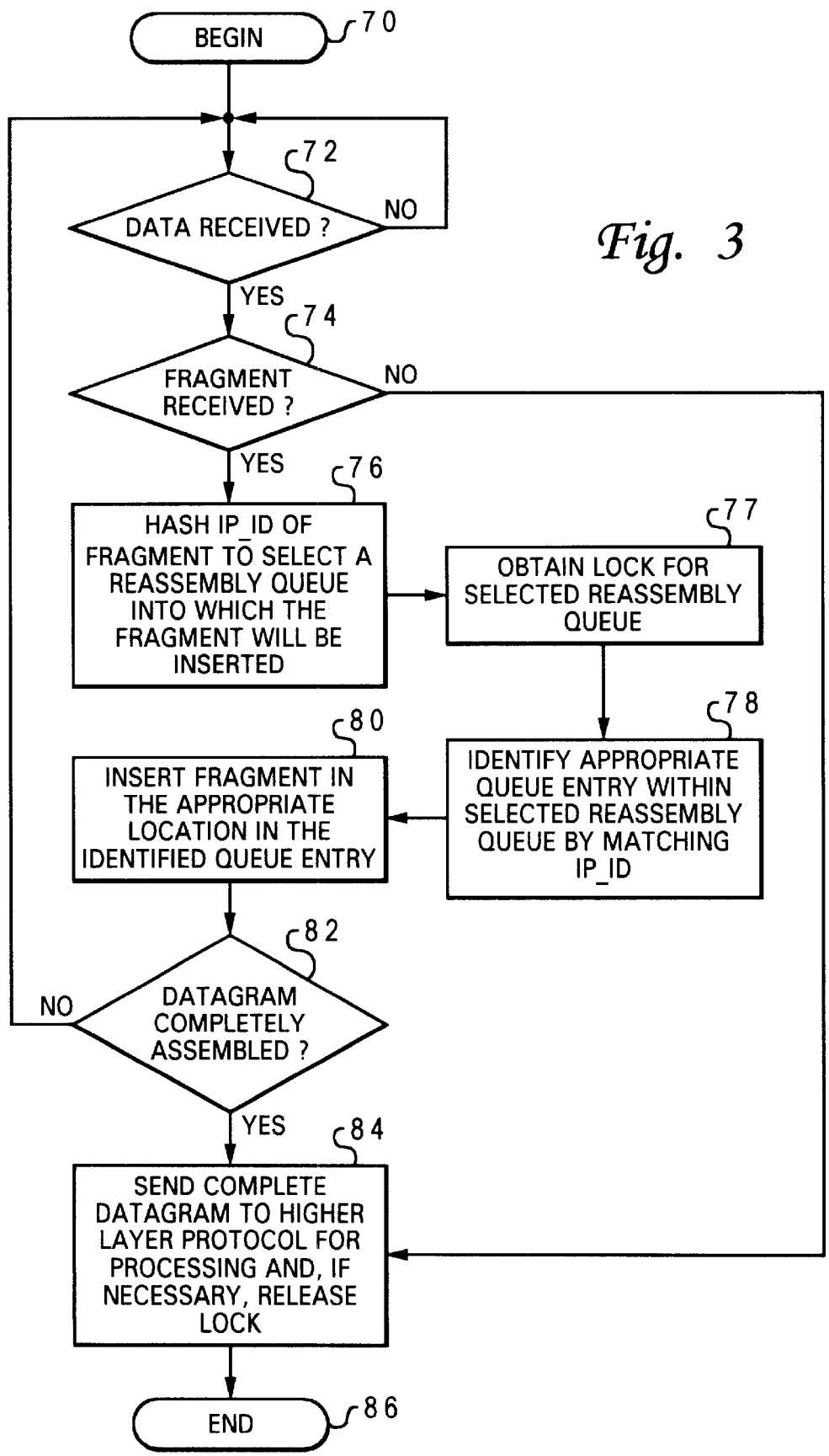
FIG. 3 is a high level logical flowchart of a method of reassembling fragmented datagrams in accordance with a preferred embodiment of the present invention.

With reference now to FIG. 3, there is illustrated a high level logical flowchart illustrating method by which a process of communication software (e.g., OS 40) reassembles fragmented datagrams in accordance with a preferred embodiment of the present invention. As will be appreciated by reference to the foregoing, the embodiment of the invention shown in FIG. 2 permits up to N of such processes to concurrently access RDS 42.

As shown in FIG. 3, the process begins at block 70 and thereafter proceeds to block 72. The process iterates at block 72 until the process receives at least a fragment of a datagram to process. In response to receipt of at least a fragment of a datagram, the process proceeds to block 74, which depicts a determination of whether or not a complete datagram or only a datagram fragment has been received. The determination depicted at block 74, may be made, for example, by comparing a length of the received data with the value of a length field in the header or by checking a fragmentation field (e.g., the ip-mf field of an IP header) in the header of the received data. In response to a determination at block 74 that a complete datagram has been received, no access to RDS 42 is required, and the process passes to block 84, which is described below. However, if a determination is made at block 74 that only a fragment of a datagram has been received, the process proceeds to block 76 and following blocks.

Block 76 illustrates the process selecting a reassembly queue 50 within RDS 52 in which the received fragment will be combined with other fragment to reassemble a datagram. In a preferred embodiment, the reassembly queue 50 is selected by hashing the ip_id (i.e., the datagram ID) appearing the fragment's header, for example, utilizing a hash function such as MOD (i.e., the remainder function). Assuming that received datagram fragments have well distributed IDs, a simple hash function like MOD tends to hash fragments to different reassembly queues, thereby minimizing contention over the associated locks 58 in LT 44. Thus, the process should experience minimal, if any, contention when obtaining the lock 58 within LT 44 associated with the selected reassembly queue 50, as shown at block 77. Next, at block 78, the process identifies the appropriate queue entry 52 within the selected reassembly queue 50 by comparing the ip_id of the datagram fragment with the ip_id's of other fragments already stored in the selected reassembly queue 50. Of course, if no matches are found in the selected reassembly queue 50, the fragment is the first received fragment from a new datagram, and a new queue entry is accordingly allocated to the datagram.

As shown at block 80, the received fragment is then inserted in the appropriate location 54 in the identified queue entry 52, for example, by reference to the value of the ip_offset field in the fragment's header. In this manner, the first fragment is loaded into the first location 54, the second fragment is loaded into the second location 54, etc., regardless of the chronological order in which the fragments are received. A determination is made at block 82 whether or not the received fragment completes the fragmented datagram being reassembled in RDS 42. If not, the process returns to block 72, which has been described. If, however, the process determines at block 82 that reassembly of the datagram is complete, the process shown in FIG. 3 proceeds to block 84, which illustrates the process sending the reassembled datagram to the next higher layer protocol (e.g., network layer to transport layer) for processing. The process then deallocates the queue entry 52 allocated to the reassembled datagram, releases any lock 58 obtained at block 77, and terminates processing at block 86.

As has been described, the present invention provides an improved method, system, and program product for reassembling fragmented datagrams. In accordance with the present invention, the datagrams are reassembled in a reassembly data structure that permits multiple processes to concurrently accesses a respective plurality of multiple reassembly queues. In this manner, contention for access to the reassembly queues is greatly reduced, and communication performance is increased, particularly for protocols such as UDP that tend to have highly fragmented datagrams.

While the invention has been particularly shown and described with reference to a preferred embodiment, it will be understood by those skilled in the art that various changes in form and detail may be made therein without departing from the spirit and scope of the invention. For example, although aspects of the present invention have been described with respect to a computer system executing software that directs the functions of the present invention, it should be understood that present invention may alternatively be implemented as a program product for use with a data processing system. Programs defining the functions of the present invention can be delivered to a data processing system via a variety of signal-bearing media, which include, without limitation, non-rewritable storage media (e.g., CD-ROM), rewritable storage media (e.g., a floppy diskette or hard disk drive), and communication media, such as digital and analog networks. It should be understood, therefore, that such signal-bearing media, when carrying or encoding computer readable instructions that direct the functions of the present invention, represent alternative embodiments of the present invention.

What is claimed is:

1. A method for reassembling fragmented datagrams, said method comprising:

receiving a plurality of fragments of a plurality of datagrams;

a plurality of processes concurrently accessing a reassembly data structure to store the plurality of fragments, such that the plurality of datagrams are incrementally reassembled from the plurality of fragments; and in response to completing reassembly of the datagram, passing the reassembled datagram to a higher protocol layer and deallocating the reassembled datagram from the reassembly data structure.

2. The method of claim 1, wherein the reassembly data structure includes a plurality of reassembly queues that each contains one or more entries for reassembling datagrams, and wherein concurrently accessing comprises concurrently accessing different ones of said plurality of reassembly queues.

3. The method of claim 2, and further comprising each of said plurality of processes selecting a respective reassembly to access by hashing a datagram identifier within a respective one of said plurality of fragments.

4. The method of claim 2, and further comprising each of said plurality of processes obtaining a respective one of a plurality of locks prior to accessing said reassembly data structure, wherein each of said plurality of locks is associated with a respective one of said plurality of reassembly queues.

5. The method of claim 1, and further comprising each of said plurality of processes obtaining a respective one of a plurality of locks prior to accessing said reassembly data structure.

6. The method of claim 1, wherein a plurality of processes concurrently accessing said reassembly data structure comprises a plurality of operating system processes concurrently accessing said reassembly data structure.

7. The method of claim 1, wherein receiving a plurality of fragments of a plurality of datagrams comprises receiving a plurality of fragments of Internet Protocol (IP) datagrams.

8. A data processing system, comprising:

processing resources;

a memory coupled to the processing resources, said memory containing:

a reassembly data structure; and communication software executable by the processing resources as a plurality of processes, wherein the plurality of processes, responsive to receipt at the data processing system of a plurality of fragments of a plurality of datagrams, concurrently access a reassembly data structure to store the plurality of fragments, such that the plurality of datagrams are incrementally reassembled from the plurality of fragments, and wherein said plurality of processes, responsive to completing reassembly of a datagram, pass the reassembled datagram to a higher protocol layer and deallocate die reassembled datagram from the reassembly data structure.

9. The data processing system of claim 8, wherein the reassembly data structure includes a plurality of reassembly queues that each contains one or more entries for reassembling datagrams, and wherein the plurality of processes concurrently access different ones of said plurality of reassembly queues.

10. The data processing system of claim 9, wherein each of said plurality of processes selects a respective reassembly to access by hashing a datagram identifier within a respective one of said plurality of fragments.

11. The data processing system of claim 9, said memory further comprising a lock table having a plurality of locks each associated with a respective one of said plurality of reassembly queues, wherein each of said plurality of processes obtains a respective one of the plurality of locks prior to accessing said reassembly data structure.

12. The data processing system of claim 8, wherein the plurality of processes comprise operating system processes.

13. The data processing system of claim 8, wherein the plurality of fragments comprise fragments of Internet Protocol (IP) datagrams.

14. A program product, comprising:

a computer-usable medium;

within said computer-usable medium, communication software executable as a plurality of processes, wherein the plurality of processes, responsive to receipt at a data processing system of a plurality of fragments of a plurality of datagrams, concurrently access a reassembly data structure to store the plurality of fragments, such that the plurality of datagrams are incrementally reassembled from the plurality of fragments, wherein said plurality of processes, responsive to completing reassembly of a datagram, pass the reassembled datagram to a higher protocol layer and deallocate the reassembled datagram from the reassembly data structure.

15. The program product of claim 14, wherein the reassembly data structure includes a plurality of reassembly queues that each contains one or more entries for reassembling datagrams, and wherein the plurality of processes concurrently access different ones of said plurality of reassembly queues.

16. The program product of claim 15, wherein each of said plurality of processes selects a respective reassembly to access by hashing a datagram identifier within a respective one of said plurality of fragments.

17. The program product of claim 15, wherein the reassembly data structure has an associated lock table having a plurality of locks each associated wit a respective one of said plurality of reassembly queues, wherein each of said plurality of processes obtains a respective one of the plurality of locks prior to accessing said reassembly data structure.

18. The program product of claim 14, wherein the communication software forms a portion of an operating system, and wherein the plurality of process comprise operating system processes.

* * * * *